(12) United States Patent
Chang et al.

(10) Patent No.: US 8,036,623 B2
(45) Date of Patent: Oct. 11, 2011

(54) WIRELESS RECEIVER WITH NOTCH FILTER TO REDUCE EFFECTS OF TRANSMIT SIGNAL LEAKAGE

(75) Inventors: Li-Chung Chang, Irvine, CA (US); Prasad S. Gudem, San Diego, CA (US); Jose Cabanillas, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 597 days.

(21) Appl. No.: 11/777,249

(22) Filed: Jul. 12, 2007

(65) Prior Publication Data

US 2008/0227409 A1    Sep. 18, 2008

Related U.S. Application Data (60) Provisional application No. 60/894,546, filed on Mar. 13, 2007.

(51) Int. Cl.
*H04B 1/38*    (2006.01)
(52) U.S. Cl. .................................. 455/296; 455/307
(58) Field of Classification Search .................. 455/296, 455/303, 304, 305, 307, 339; 375/349, 350, 375/351

See application file for complete search history.

(56) References Cited

U.S. PATENT DOCUMENTS

| | | | | |
|---|---|---|---|---|
| 6,035,213 | A * | 3/2000 | Tokuda et al. | 455/296 |
| 7,127,226 | B2 * | 10/2006 | Tolson | 455/296 |
| 7,155,179 | B1 | 12/2006 | Rothenberg | |
| 2005/0107051 | A1 | 5/2005 | Aparin et al. | |
| 2008/0009258 | A1 * | 1/2008 | Safarian et al. | 455/307 |

FOREIGN PATENT DOCUMENTS

EP    1675270    6/2006

OTHER PUBLICATIONS

International Search Report and Written Opinion—PCT/US2008/056711, International Search Authority—European Patent Office—Nov. 4, 2008.

* cited by examiner

*Primary Examiner* — Thanh Le
(74) *Attorney, Agent, or Firm* — Kenyon S. Jenckes; Ramin Mobarhan (57) ABSTRACT

This disclosure describes techniques for reducing adverse effects of TX signal leakage in a full-duplex, wireless communication device. The techniques make use of a notch filter to reject TX signal leakage in a signal processed in the RX path of the wireless communication device. The notch filter may be constructed as a complex notch filter using passive resistor and capacitor components to produce a notch frequency that attenuates TX signal leakage components in a desired signal. The notch filter may be applied to a down-converted, baseband signal produced by a passive mixer.

36 Claims, 8 Drawing Sheets

WIRELESS RECEIVER WITH NOTCH FILTER TO REDUCE EFFECTS OF TRANSMIT SIGNAL LEAKAGE

CLAIM OF PRIORITY UNDER 35 U.S.C. §119

This application claims the benefit of Provisional Patent Application No. 60/894,546, filed Mar. 13, 2007, and entitled "High-Linearity Receiver Using Notch at Tx to Rx Offset Frequency", the entire content of which is incorporated herein by reference.

TECHNICAL FIELD

This disclosure relates generally to wireless communication devices and, more particularly, to techniques for reducing adverse effects of transmit signal leakage in a wireless full-duplex communication system.

BACKGROUND

A wireless device in a full-duplex communication system can simultaneously transmit and receive signals to support two-way communication. In a transmit path, a power amplifier amplifies a radio frequency (RF) signal for transmission. The transmit (TX) signal is routed through a duplexer and transmitted via an antenna. In the receive path, a desired receive (RX) signal is received via the antenna and coupled through the duplexer to a low noise amplifier (LNA). Following amplification by the LNA, the RX signal may be filtered and down-converted to baseband by a mixer. The down-converted RX signal is processed by other baseband components, such as a modem, to recover the received data.

In a full-duplex system, the TX path can interfere with the RX path. A portion of the TX signal may be coupled from the duplexer to the RX path, resulting in TX signal leakage. TX signal leakage can cause interference in the desired RX signal processed by the RX path. The interference may include second order distortion and/or cross-modulation distortion. The desired RX signal is a signal received via the antenna, in contrast to a TX signal received via leakage across the duplexer. Because the transmitter and receiver frequencies are different, the TX signal leakage can be rejected by filtering. Even with filtering, however, a residual amount of TX leakage can remain, causing degradation of the desired RX signal.

SUMMARY

In general, this disclosure describes techniques for reducing adverse effects of TX signal leakage in a full-duplex, wireless communication device. The techniques make use of a notch filter to reject TX signal leakage in a signal processed in the RX path of the wireless communication device. The notch filter may be constructed as a complex notch filter using passive resistor and capacitor components to attenuate TX signal leakage components in a desired signal near a selected notch frequency. The notch filter may be applied to a down-converted, baseband signal produced by a passive mixer.

The disclosure provides, in some aspects, a method comprising amplifying a received RF input signal comprising a desired signal and a transmit leakage signal, down-converting a frequency of the amplified signal, and filtering the down-converted signal with a notch filter to substantially reduce the down-converted transmit leakage signal.

In other aspects, the disclosure provides a wireless communication device comprising an antenna, a radio frequency (RF) transmitter that generates a transmit (TX) signal, a duplexer that couples the TX signal to the antenna, an RF receiver that receives an RF input signal from the antenna via the duplexer. The RF receiver comprises an amplifier that amplifies the received RF input signal comprising a desired signal and a transmit leakage signal coupled from the duplexer, a mixer that down-converts the amplified signal, and a notch filter that filters the down-converted signal to substantially reduce the down-converted transmit leakage signal.

In additional aspects, the disclosure provides a notch filter for a radio frequency (RF) receiver, the notch filter comprising a first resistor coupled between a positive in-phase (I) input and a positive I output, a second resistor coupled between a negative I input and a negative I output, a third resistor coupled between a positive quadrature (Q) input and a positive Q output, a fourth resistor coupled between a negative Q input and a negative Q output, a first capacitor coupled between the positive I input and the positive Q output, a second capacitor coupled between the negative I input and the negative Q output, a third capacitor coupled between the positive Q input and the negative I output, and a fourth capacitor coupled between the negative Q input and the positive I output, wherein the resistor and capacitor values are selected to substantially reduce a down-converted transmit leakage signal in an input signal applied at the inputs.

In other aspects, the disclosure provides a radio frequency (RF) receiver comprising an amplifier that amplifies a received RF input signal comprising a desired signal and a transmit leakage signal, a mixer that down-converts a frequency of the amplified signal, and a notch filter that filters the down-converted signal to substantially reduce the down-converted transmit leakage signal.

The details of one or more examples of are set forth in the accompanying drawings and the description below. Other features, objects, and advantages will be apparent from the description and drawings, and from the claims.

DETAILED DESCRIPTION

This disclosure describes techniques for reducing adverse effects of TX signal leakage in a full-duplex, wireless communication device. The techniques make use of a notch filter to reject TX signal leakage in a signal processed in the RX path of the wireless communication device. The notch filter may be constructed as a complex notch filter comprising resistor and capacitor components arranged to attenuate a TX signal leakage component in a desired signal near a selected notch frequency.

The notch filter may be applied to a down-converted, baseband signal produced by a passive mixer. The received signal may be amplified by a low noise amplifier before down-conversion by the mixer. The notch filter may be configured to provide a notch frequency that approximates an offset frequency of the TX leakage signal component relative to the desired RX signal at baseband (e.g., dc). Using a notch filter with a notch at approximately the TX to RX offset frequency can support a high linearity receiver.

The mixer may down-convert a component of the amplified signal corresponding to the desired signal to approximately 0 Hz, i.e., dc, and down-convert a component of the amplified signal corresponding to the transmit leakage signal to an offset frequency. The notch filter may substantially reduce the TX leakage signal component of the received signal near the offset frequency prior to further baseband processing. In this manner, the notch filter can reduce distortion caused by the TX leakage signal, which could otherwise undermine reliable reception. Examples of distortion caused by TX signal leakage include second order distortion and cross-modulation distortion (XMD). Incorporation of a notch filter as described in this disclosure may be effective in rejecting at least a portion of the TX signal leakage, thereby reducing such distortion.

In some aspects of the disclosure, the low noise amplifier may have differential amplifier outputs. The mixer may have differential mixer inputs coupled to the differential outputs of the amplifier, and differential mixer outputs coupled to differential inputs of the notch filter. In particular, the mixer may generate positive and negative in-phase (I) components and positive and negative quadrature (Q) components, which may be received by respective inputs of the notch filter. The Q components are 90 degrees out of phase with the respective I components.

The notch filter, in some example aspects of this disclosure, may include resistors coupled between various inputs and outputs of the notch filter. For example, the notch filter may include a first resistor coupled between a positive I input and a positive I output, a second resistor coupled between a negative I input and a negative I output, a third resistor coupled between a positive Q input and a positive Q output, and fourth resistor coupled between a negative Q input and a negative Q output.

In addition, the notch filter may include capacitors coupled between various inputs and outputs of the notch filter. For example, the notch filter may include a first capacitor coupled between the positive I input and the positive Q output, a second capacitor coupled between the negative I input and the negative Q output, a third capacitor coupled between the positive Q input and the negative I output, and a fourth capacitor coupled between the negative Q input and the positive I output.

The resistors and capacitors in the notch filter may have values selected such that the complex filter substantially attenuates the down-converted signal near a notch frequency that approximates an offset frequency of the down-converted transmit leakage signal. The capacitors may have the same capacitance values as one another, and the resistors may have the same resistance values as one another. Additionally, at a desired notch frequency, the impedance values of the capacitors and resistors may be substantially the same.

The notch filter may receive four signals from the differential outputs of the mixer, i.e., the positive I signal, the positive Q signal, the negative I signal, and the negative Q signal. The positive Q signal is 90 degrees out of phase with the positive I signal. The negative Q signal is 90 degrees out of phase with the negative I signal. The notch filter may be configured such that the TX leakage signal is substantially attenuated while the desired signal is substantially preserved. For example, the resistors and capacitors in the notch filter may be arranged to attenuate the TX leakage signal by phase shifting the I component of the TX leakage signal such that it is approximately 180 degrees out of phase with the Q component of the TX leakage signal. After this phase shift, the two signals may be added together. The I and Q components of the TX leakage signal may be substantially identical, except for the 180 degree phase difference. Consequently, when added together, the I and Q components may substantially cancel each other, thereby reducing or eliminating the TX leakage signal from the received input signal in the vicinity of the notch frequency.

In some cases, a notch filter, as described in this disclosure, may permit elimination of a surface acoustic wave (SAW) filter that is often provided between a low noise amplifier (LNA) and a mixer in an RF receiver. In particular, with a notch filter, the SAW filter may not be necessary. The SAW filter is effective in rejection of transmit leakage signals. By eliminating the SAW filter, however, it may be possible to construct an RF receiver completely on-chip, thereby reducing packaging, size, costs, and pin interconnection requirements.

A notch filter, as described in this disclosure, may be configured for use in a variety of wireless, full-duplex communication systems, and over a variety of frequency bands. Examples include the cellular band from 824 to 894 MHz, the Personal Communication System (PCS) band from 1850 to 1990 MHz, the Digital Cellular System (DCS) band from 1710 to 1880 MHz, the International Mobile Telecommunications-2000 (IMT-2000) band from 1920 to 2170 MHz, and the like. A receiver incorporating such a notch filter may be useful in wireless communication, of voice, data, video, audio or other information.

Figure 1:
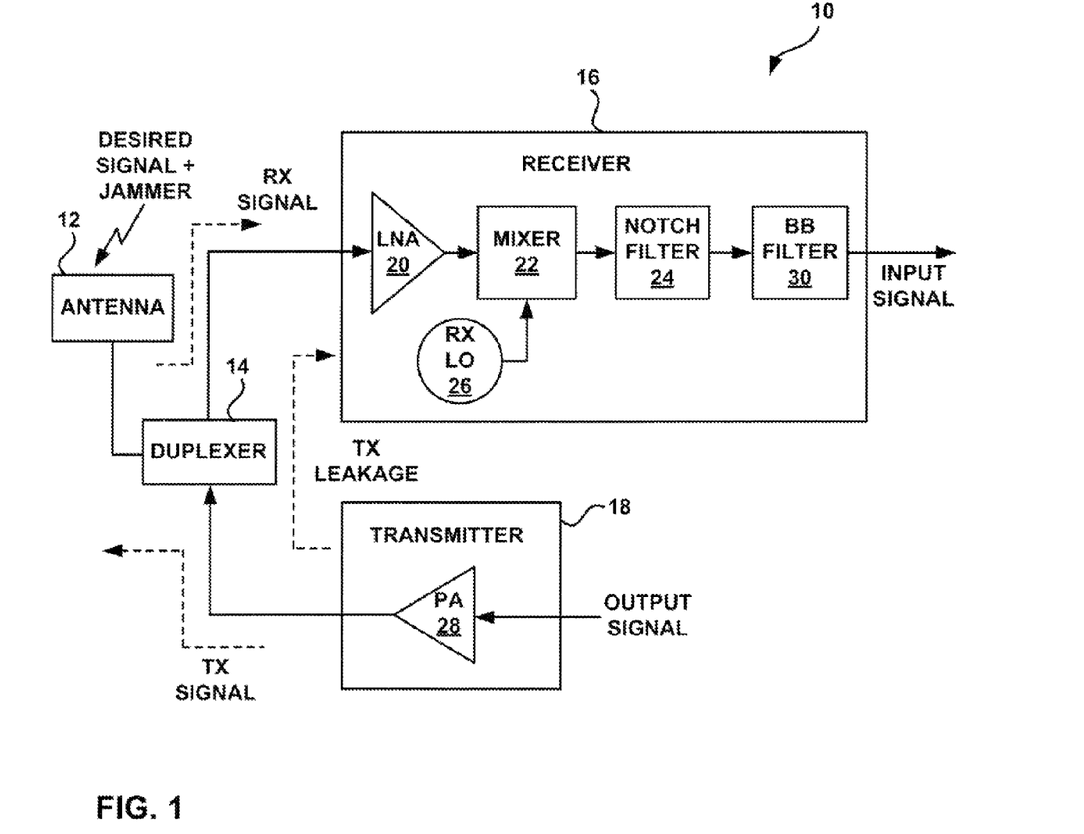
FIG. 1 is a block diagram illustrating an RF section of a wireless communication device (WCD) including a notch filter.

FIG. 1 is a block diagram illustrating an exemplary RF section of a wireless communication device 10 including a notch filter 24. Wireless communication device 10 may be any of a variety of mobile or stationary devices with wireless capabilities, such as a cellular radiotelephone, satellite phone, smart phone, personal digital assistant (PDA), mobile or desktop computer, digital video or audio device, gaming console, television console, a set top box, or any other device equipped for wireless communication.

As shown in FIG. 1, device 10 includes an antenna 12 that transmits and receives wireless RF signals. A duplexer 14 couples RX input signals (RX SIGNAL) received by antenna 12 to a receiver 16, and couples TX output signals (TX SIGNAL) generated by a transmitter 18 to antenna 12. In the example of FIG. 1, receiver 16 includes low noise amplifier (LNA) 20, mixer 22, notch filter 24, local oscillator (LO) 26, and baseband (BB) filter 30. Transmitter 18 includes a power amplifier 28 that amplifies an RF output signal to produce a TX RF signal for transmission via duplexer 14 and antenna 12. Transmitter 18 also may include a modem, digital-to-analog converter, mixer and filter circuitry (not shown) to modulate and filter the output signal, and up-convert the signal from a baseband to a transmit band.

In receiver 16, LNA 20 amplifies the RX signal. LNA 20 may be a differential amplifier producing a differential output signal. Mixer 22 may be a wideband mixer that multiplies the amplified, differential signal from LNA 20 with the RX LO frequency to down-convert the desired RX signal to baseband, thereby producing an RX baseband signal. Notch filter 24 filters the RX baseband signal to reduce the TX leakage signal and thereby reduce undesirable distortion. In particular, notch filter 24 provides a notch frequency at which the RX signal is strongly attenuated. Notch filter 24 is configured such that the notch frequency generally corresponds to the offset frequency of the down-converted TX leakage signal relative to the center frequency (e.g., 0 Hz) of the baseband. Baseband filter 30 (TIA) 30 substantially rejects frequencies outside the desired baseband and may include a transimpedance amplifier to convert the current output of notch filter 24 into a voltage signal. Receiver 16 may further include an analog-to-digital converter and modem (not shown) to demodulate and decode the desired RX signal.

Antenna 12 may receive both a desired signal and a jammer signal, as shown in FIG. 1. Hence, LNA 20 may receive an RX signal including the desired signal and possibly the jammer signal, as well as the TX leakage signal coupled from the transmit path via duplexer 14. LNA 20 amplifies this combined RX signal to produce an amplified RF signal. The TX leakage signal may produce second order distortion and cross modulation distortion (XMD). The jammer signal is an undesired signal that may correspond to a signal generated from a nearby source such as a wireless base station. In some cases, a jammer signal may have an amplitude that is much higher than that of the desired signal and may be located close in frequency to the desired signal. The TX leakage signal also may have a large amplitude relative to the desired signal because the transmit signal produced by power amplifier 28 is often much larger in amplitude than the desired signal.

The TX leakage signal is outside the RX band. However, TX leakage signal still may cause undesirable distortion. For example, non-linearity in LNA 20 can cause the modulation of TX leakage signal to be transferred to the narrow-band jammer, resulting in a widened spectrum around the jammer. This spectral widening is referred to as cross modulation distortion (XMD). This XMD acts as additional noise that degrades the performance of the wireless communication device. This noise degrades sensitivity so that the smallest desired signal that can be reliably detected by receiver 16 needs to have a larger amplitude. XMD can also be generated in mixer 22.

In addition, non-linearities in mixer 22 can produce second order distortion of TX signal leakage. In particular, when the signal combining the desired signal and the TX leakage signal is down-converted to baseband by mixer 22, the mixer can create second-order distortion due to its inherent non-linearity. The second order distortion can fall in the same frequency band as that occupied by the desired RX signal and, thus, decrease receiver sensitivity. In particular, the second-order distortion of the TX leakage signal can mask the down-converted, desired RX signal in the baseband. As a further concern, propagation of the TX leakage signal current into a baseband filter associated with TIA 30 can produce additional distortion.

In many receivers, to alleviate second order distortion and XMD, a SAW filter is provided at the output of LNA 20. SAW filters are characterized by sharp transition band edges and large attenuation of received components outside the RX band. For this reason, SAW filters are often used to reject TX leakage signal at the input of mixer 22, which then reduces the amount of distortion generated by the mixer. Unfortunately, the use of an RF SAW filter for TX leakage signal filtering has several disadvantages. For example, the SAW filter ordinarily must be implemented at least partially off-chip, relative to LNA 20 and mixer 22, requiring matching circuits, additional package pins and cost. In addition, the SAW filter and associated discrete components typically require additional board space and cost. A SAW filter also can result in insertion losses that degrade the gain and noise figure of receiver 16. A notch filter 24, in accordance with various aspects of this disclosure, may be used as an alternative to a SAW filter to reject the TX leakage signal.

Simply removing the SAW filter may permit second order distortions and cross-modulation, and create other substantial disadvantages. To achieve high linearity, mixer 22 may require low voltage swing at its input and output. A transimpedance amplifier (TIA) of baseband filter 30 may be provided to convert the current output of mixer 22 to a voltage signal. Ideally, the TIA will provide a virtual ground (zero impedance) at all frequencies so a low voltage swing at the output of the passive mixer 22 can be achieved. Due to limited power and device bandwidth limitations, however, the TIA will have a limited closed loop bandwidth.

After mixer 22 downconverts the desired RX signal and TX leakage signal, the RX signal may be close to baseband, and the TX leakage signal may be at some offset frequency. Due to the closed loop bandwidth, the TIA associated with baseband filter 30 will not provide an input impedance at virtual ground, and instead may present a large input impedance at the offset frequency. The input impedance may increase with frequency offset. With a strong TX leakage signal, without a SAW filter, such impedance may create very large voltage swings that render mixer 22 inoperable and create undesirable distortion.

For the case of CELL or PCS band, as examples, the TX leakage signal may be offset at 45 MHz (CELL) or 80 MHz (PCS) with respect to the desired RX frequency at dc. After zero intermediate frequency (ZIF) down-conversion, the TX leakage signal will be located at 45 MHz or 80 MHz for CELL or PCS band, respectively, while the RX signal is down-converted to close to DC. A typical TIA at 45 MHz or 80 MHz may present a large impedance due to limited close loop bandwidth. With strong TX current, and without an interstage SAW filter, such impedance may create a very large voltage swing, undermining the operation of mixer 22, as mentioned above.

As shown in FIG. 1, a notch filter 24 may be provided, in accordance with various aspects of the disclosure, to avoid the drawbacks of a SAW filter and to filter the TX leakage signal such that the TIA presents a low impedance. Notch filter 24 as described in this disclosure can ensure a substantially lower voltage swing caused by the strong transmitter leakage at the output of mixer 22. In this manner, notch filter 24 may reduce second order distortion generated by the mixer 22 due to the strong transmit leakage, reduce cross modulation distortion generated by the mixer 22 due to the mixing of the close-in jammer with strong transmit leakage, and reduce transmit leakage current into a baseband filter that follows the down-converter, e.g., with the TIA of baseband filter 30. Hence, notch filter 24 may support reduced distortion and lower noise figure degradation in a baseband filter. In addition, in some example implementations, notch filter 24 may permit RF receiver 16 to be constructed completely on-chip, reducing packaging, size, costs, and pin interconnection requirements. For example, receiver 16 may be constructed on a single chip with a smaller form factor and higher level of integration for the radio. In this case, there is no need for an interstage SAW, external matching components and external pins.

Figure 2:
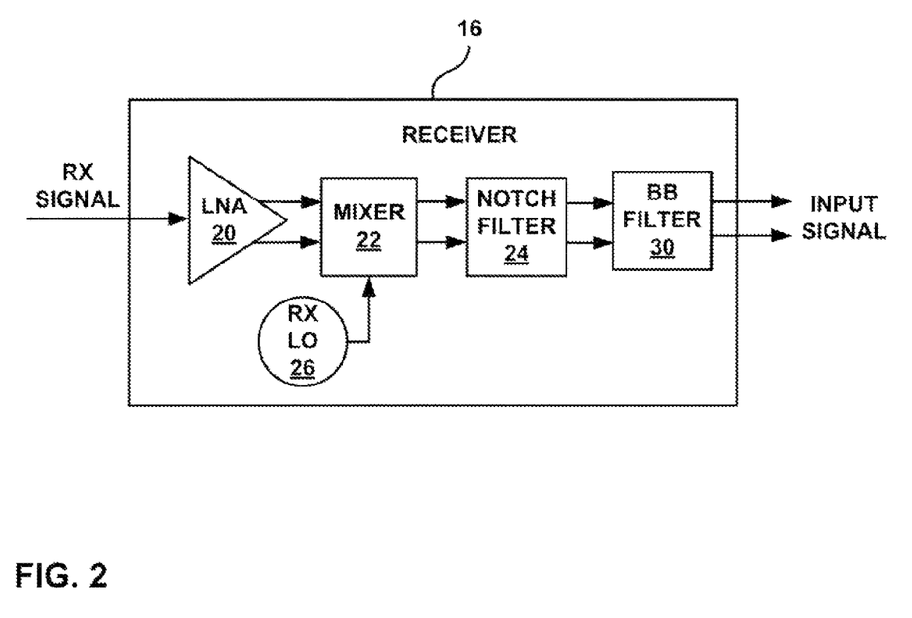
FIG. 2 is a block diagram illustrating an example receiver forming part of the RF section of FIG. 1.

FIG. 2 is a block diagram further illustrating the exemplary receiver 16 of wireless communication device 10 of FIG. 1. In the example of FIG. 2, receiver 16 has a differential architecture. For example, LNA 20 may have positive and negative differential outputs coupled to corresponding positive and negative differential inputs of mixer 22. Mixer 22 multiplies the different output signal from LNA 20 with the LO frequency produced by RX LO 26 to downconvert the RX signal to baseband, thereby producing a differential RX baseband signal. The differential RX baseband signal include I and Q components.

Notch filter 24 receives the differential baseband signal produced by mixer 22 and filters the signal to produce a differential output signal that is applied to differential inputs of baseband filter 30. Notch filter 24 filters the differential baseband signal to attenuate the baseband signal at frequencies near the offset frequency of the down-converted leakage signal prior to baseband filtering in baseband filter 30. The offset frequency is the frequency to which the TX leakage signal is down-converted (e.g., 45 MHz for CELL or 80 MHz for PCS), relative to the frequency of the desired RX signal (e.g., 0 Hz). The notch filter may handle both I and Q components of the down-converted signal and is therefore a complex notch filter.

Figure 3:
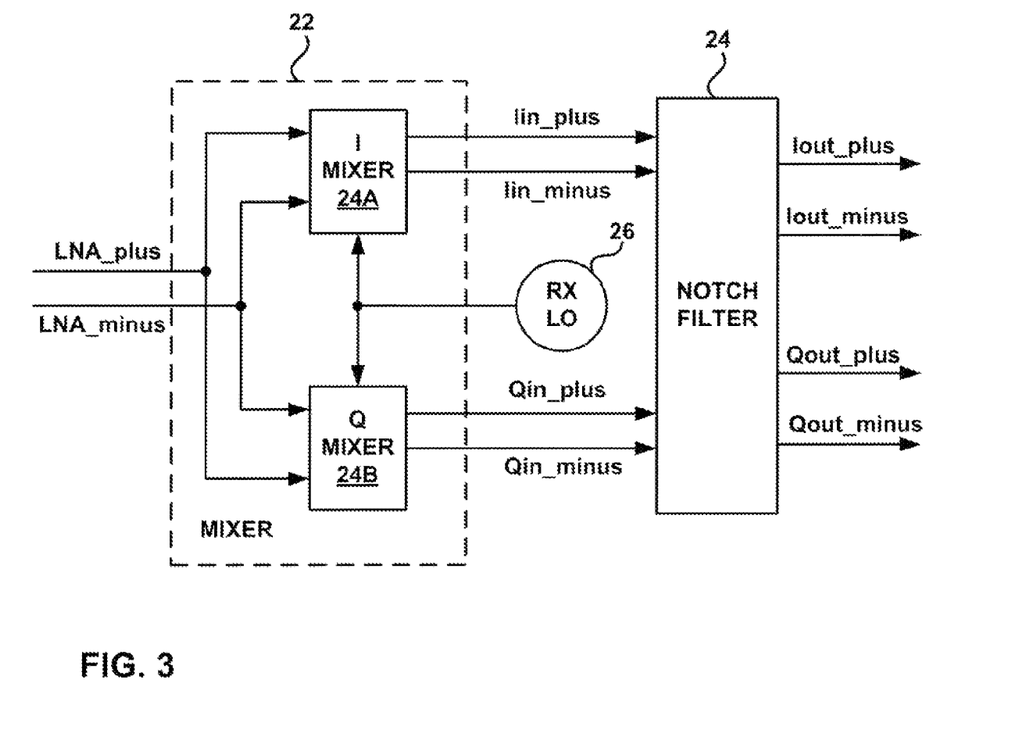
FIG. 3 is a block diagram illustrating an example mixer for down-conversion of incoming signals in the receiver of FIG. 1.

FIG. 3 is a block diagram illustrating an exemplary mixer 22 that receives the differential output of LNA 20. In the example of FIG. 1, the mixer is a passive mixer with a differential architecture comprising an in-phase (I) component mixer 22A and a quadrature (Q) component mixer 22B. The I and Q component mixers 22A, 22B both receive the LO signal from RX LO 26. The output of LNA 20 may be provided to both I component mixer 22A and Q component mixer 22B, i.e., as positive and negative differential outputs. For example, component mixer 24A and Q component mixer 24B each receive positive and negative outputs LNA_plus and LNA_minus of LNA 20. In some cases, ac coupling capacitors (not shown) may be provided between the LNA 20 and the differential inputs of passive mixer 22

I component mixer 24A mixes the positive and negative I components from LNA 20 with the LO frequency and generates positive and negative I inputs Iin_plus and Iin_minus for notch filter 24. Similarly, Q component mixer 24B mixes the positive and negative Q components with the LO frequency and generates positive and negative Q inputs Qin_plus and Qin_minus for notch filter 24. After downconversion by mixer 22, the desired RX signal may be at baseband and the TX leakage signal may be at some offset frequency. For example in the case of CELL band, TX leakage signal may be located at 45 MHz and the desired RX signal may be close to 0 Hz, i.e., DC.

The output of mixer 22B may be 90 degrees out of phase with the output of mixer 22A. In particular, the signal Iin_plus may be 90 degrees out of phase with Qin_plus, and the signal Iin_minus may be 90 degrees out of phase with Qin_minus. Notch filter 36 receives the output of mixer 22. Notch filter 24 may have a differential architecture to filter the differential I components Iin_plus and Iin_minus and differential Q components Qin_plus and Qin_minus to reduce the TX leakage signal.

Figure 4:
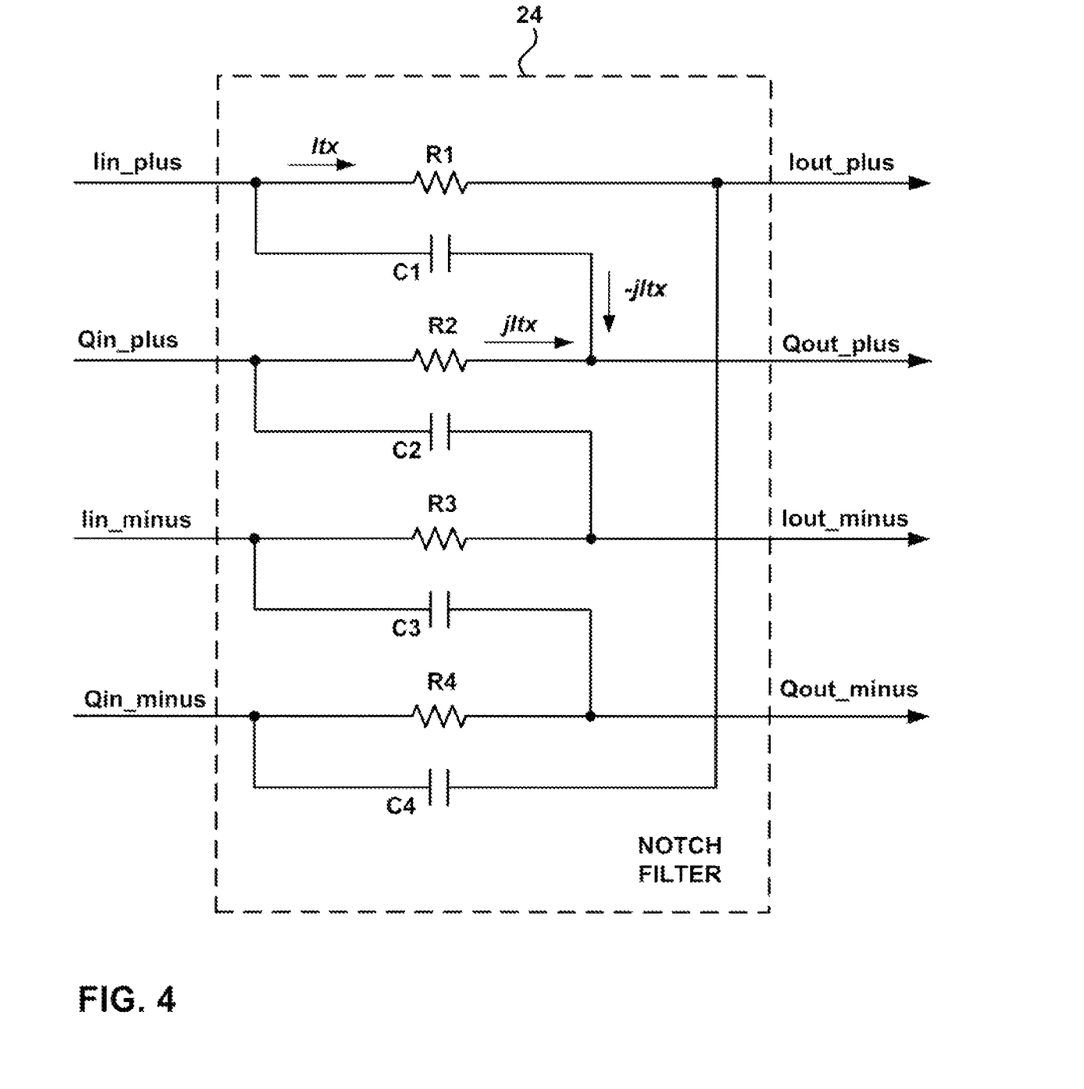
FIG. 4 is a circuit diagram illustrating an example notch filter for use in the receiver of FIG. 1.

FIG. 4 is a circuit diagram illustrating an example implementation of notch filter 24. As shown in FIG. 4, notch filter 24 may be constructed as a complex notch filter comprising a combination of resistors and capacitors. In the example of FIG. 4, notch filter 24 comprises four resistors R1, R2, R3, and R4 and four capacitors C1, C2, C3, and C4. The resistors and capacitors may be formed on-chip with resistors and metal-insulator-metal (MIM) or poly-poly capacitors. The value of all resistors may be the same, and the value of all capacitors may be the same. Additionally, the value of each capacitor may be such that, at the offset frequency of the transmit leakage signal after downconversion, the impedance of each capacitor is substantially the same as the impedance of each resistor.

The complex notch filter is realized using passive resistor (R) and capacitor (C) components R1-R4 and C1-C4 that interconnect with differential outputs from I (Iin_plus and Iin_minus) and Q (Qin_plus and Qin_minus) channels output by passive mixer 22, as shown in FIG. 4. Each Q channel is 90 degrees out of phase with the respective I channel. More particularly, the Q channel is 90 degrees delayed relative to the I channel, and therefore is in quadrature relative to the I channel. The resistors R1-R4 and capacitors C1-C4 also interconnect with different outputs Iout_plus, Iout_minus, Qout_plus and Qout_minus, which are provided to differential inputs of baseband filter 30.

In notch filter 24, signal Iin_plus is the in-phase positive input signal, current Iin_minus is the in-phase negative input signal, Qin_plus is the quadrature phase positive input signal, and Qin_minus is the quadrature negative input signal. Iout_plus is the in-phase positive output signal, Iout_minus is the in-phase negative output signal, Qout_plus is the quadrature phase positive output signal, and Qout_minus is the quadrature phase negative output signal.

In general, the circuit topology of notch filter 24 may be implemented such that the R and C values are properly chosen to create a notch frequency (fnotch) at or near an offset frequency of the down-converted TX signal leakage according to the following formula:

$$fnotch = \frac{1}{2\pi RC}$$

where R represents the value of each resistor R1, R2, R3, R4 and C represents the value of each capacitor C1, C2, C3, C4. The resistor and capacitor values may be selected such that the notch frequency approximates the offset frequency of the down-converted TX leakage signal relative to the desired signal at baseband (e.g., dc).

As examples, the notch filter may be designed to have a notch frequency fnotch selected to reject the down-converted TX leakage signal at approximately 45 MHz for the cellular band (CELL) or approximately 80 MHz for the PCS band with respect to the down-converted RX signal frequency at approximately DC. In other words, the notch frequency may be selected to approximate the offset frequency of the TX leakage signal upon downconversion by mixer 22, and may vary according to the particular type of the wireless communication system, e.g., cellular, PCS, DCS, or the like.

For the CELL band after downconversion, as an example, the offset frequency for the transmit leakage signal may be approximately 45 MHz. In this example, if a resistance value R of a resistor R1, R2, R3 or R4 is 10 ohms, then a capacitance value C of a capacitor C1, C2, C3, C4 may be selected to be approximately 353.7 picofarads (pF) so that the capacitor produces an impedance equivalent to 10 ohms at the offset frequency of 45 MHz. Hence, in this example, to achieve a notch frequency (fnotch)=45 MHz, R and C values may be selected to be 10Ω and 353.7 pF, respectively. As a result, at 45 MHz, the capacitance C will represent an impedance equivalent to 10 ohms with a −90 degree phase shift relative to a corresponding resistor. Other combinations of R and C values may be used, however, to achieve a desired 45 MHz notch frequency, or other desired notch frequencies.

In the example of FIG. 4, notch filter 24 receives input signals Iin_plus, Iin_minus, Qin_plus, and Qin_minus from mixer 22. The input signals Iin_plus, Iin_minus, Qin_plus, and Qin_minus comprise current from the desired signal at baseband (e.g., DC) and current from the TX leakage signal at an offset frequency, e.g., 45 MHz for CELL band or 80 MHz for PCS band. The current at Qin plus is 90 degrees out of phase with the current at Iin_plus, and the current at Qin_minus is 90 degrees out of phase with the current at Iin_minus. The current from the TX leakage signal at Iin_plus may be referred to as Itx. The transmit leakage signal current at Qin_plus may be referred to as jItx, where j signifies the +90 degree phase shift of the quadrature signal Qin_plus relative to the in-phase signal Iin_plus. Similarly, the magnitude of the transmit leakage signal current at Iin_minus may be referred to as Itx, and the transmit leakage current at Qin_minus may be referred to as jItx to signify a 90 degree phase shift from Iin_minus, although the currents may be negative relative to the currents through Iin_plus and Qin_plus.

In the complex notch filter 24 in FIG. 4, first, second, third and fourth resistors R1-R4 are coupled in series between Iin_plus and Iout_plus, Qin_plus and Qout_plus, Iin_minus and Iout_minus, and Qin_minus and Qout_minus, respectively. First, second, third, and fourth capacitors C1-C4 are coupled between Iin_plus and Qout_plus, Qin_plus and Iout_minus, Iin_minus and Qout_minus, and Qin_minus and Iout_plus, respectively.

More particularly, as shown in FIG. 4, notch filter 24 forms a complex notch filter comprising a first resistor R1 coupled between the positive in-phase (I) input (Iin_plus) and the positive I output (Iout_plus), a second resistor R2 coupled between the positive quadrature (Q) input (Qin_plus) and the positive Q output (Qout_plus), a third resistor R3 coupled between the negative I input (Iin_minus) and the negative I output (Iout_minus), and a fourth resistor R3 coupled between the negative Q input (Qin_minus) and the negative Q output (Qout_minus).

In addition, the complex notch filter 24 includes a first capacitor C1 coupled between the positive I input (Iin_plus) and the positive Q output (Qout_plus), a second capacitor C2 coupled between the positive Q input (Qin_plus) and the negative I output (Iout_minus), a third capacitor C3 coupled between the negative I input (In_minus) and the negative Q output (Qin_minus), and a fourth capacitor C4 coupled between the negative Q input (Qin_minus) and the positive I output (Iout_plus). As mentioned above, the resistor and capacitor values are selected to produce a notch frequency fnotch at which notch filter 24 substantially reduces a down-converted transmit leakage signal in the input signal applied at the inputs to notch filter 24.

The effect of notch filter 24 in reducing the transmit leakage signal component will now be described. The current at Qout_plus will be analyzed first, followed by the current at Iout_minus, Qout_minus, and then finally Iout_plus. The current at Qout_plus comprises current flowing through resistor R2 from Qin_plus and the current flowing through C1 from Iin_plus. For Iin_plus, the capacitor C1 coupled between Iin_plus and Qout_plus is selected to present substantially the same impedance as resistor R1 coupled between Iin_plus and Iout_plus at the offset frequency. Therefore, the current flowing in from Iin_plus may be equally split among Itx flowing from Iin_plus to Iout_plus across resistor R1, and –jItx flowing from Iin_plus to Qout_plus across capacitor C1. The –j signifies the –90 degree phase shift in the current Itx from Iin_plus after passing through capacitor C1. For Qin_plus, because the Q channel is 90 degree phase shifted from the I channel at Iin, the current flowing through the resistor R2 is jItx. Here, j signifies a +90 degree phase shift in the Q channel relative to the corresponding I channel.

The desired signal at baseband (dc) does not flow through capacitor C1 because of the capacitive coupling. However, the transmit leakage current Itx flows through capacitor C1. Again, capacitor C1 phase shifts the current Itx flowing through it by –90 degrees, producing a current of –jItx. The current jItx at Qin_plus is +90 degrees ahead of the current at Iin_plus. Capacitor C1 phase shifts the current at Iin_plus so that it is an additional 90 degrees behind the Qin_plus signal, producing the –jItx signal. Because the current Itx at Qin_plus is 90 degrees ahead, and the current –jItx passing through capacitor C1 is 90 degrees behind, the phase difference between the two currents is 180 degrees. The two currents have equivalent magnitudes Itx. The 180 degree phase difference results in a cancellation between jItx and –jItx, thereby cancelling the TX leakage current flowing from Qin_plus to Qout_plus in the vicinity of the notch frequency fnotch=$1/2\pi RC$. As a result, the Qout_plus output produces a current that substantially reduces or eliminates the TX leakage signal.

The resistors and capacitors associated with the other outputs Iout_plus, Iout_minus, and Qout_minus may be selected and arranged in a similar manner to reduce or eliminate the TX leakage signal near the notch frequency in the signals flowing from those outputs. The current at Iout_minus, for example, is the current from Iin_minus flowing across resistor R3 summed with the current out of capacitor C2. As described above, the current through C2 will be phase shifted by –90 degrees, resulting in a 180 degree phase difference between the equivalent Itx currents flowing through resistor R3 and capacitor C2. Consequently, the TX leakage current is cancelled out and only the desired signal current remains at output Iout_minus.

Similarly, the current at Qout_minus is the current from Qin_minus flowing across resistor R4 summed with the current flowing across C3. With the 180 degree phase difference, in the current at Qout_minus, the TX leakage current is cancelled out and only the desired signal current remains. The current at Iout_plus is the current from Iin_plus flowing across resistor R1 summed with the current flowing across capacitor C4. With the 180 degree phase difference, the TX leakage current in the current flowing to Iout_plus is cancelled out and only the desired signal current remains.

Figure 5:
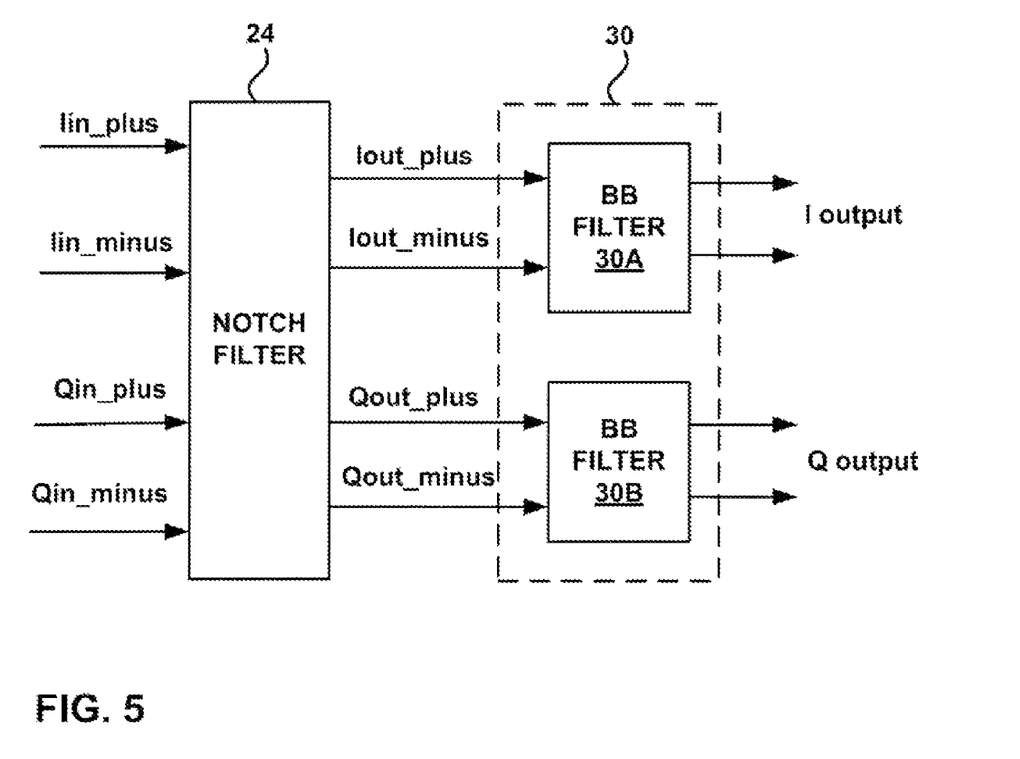
FIG. 5 is a block diagram illustrating an example baseband filter for use in the receiver of FIG. 1.

FIG. 5 is a block diagram illustrating an example baseband filter 30 for use in the receiver of FIG. 1. In the example of FIG. 5, baseband filter receives the Iout_plus, Iout_minus, Qout_plus, and Qout_minus outputs from notch filter 24, and applies baseband filtering to reject frequencies outside the desired baseband. For example, baseband filter 30 may apply bandpass filtering according to retain frequencies within the desired baseband and reject frequencies outside the desired baseband. In addition, baseband filter 30 may include transimpedance amplifier (TIA) circuitry to convert the currents signals obtained from notch filter 24 into voltage signals, e.g., for application to analog-to-digital converter circuitry and demodulation circuitry.

As shown in FIG. 5, baseband filter 30 may include an I-component baseband filter module 30A and a Q-component baseband filter module 30B. I-component baseband filter module 30A applies baseband filtering to the differential I component current signals Iout_plus and Iout_minus to produce filtered I outputs. Similarly, Q-component baseband filter module 30B applies baseband filtering to the differential Q component current signals Qout_plus and Qout_minus to produce filtered Q outputs. Notch filter 24 eliminates or substantially reduces the TX leakage signal near the notch frequency before application of the received signal to baseband filter module 30A, 30B.

Figure 6:
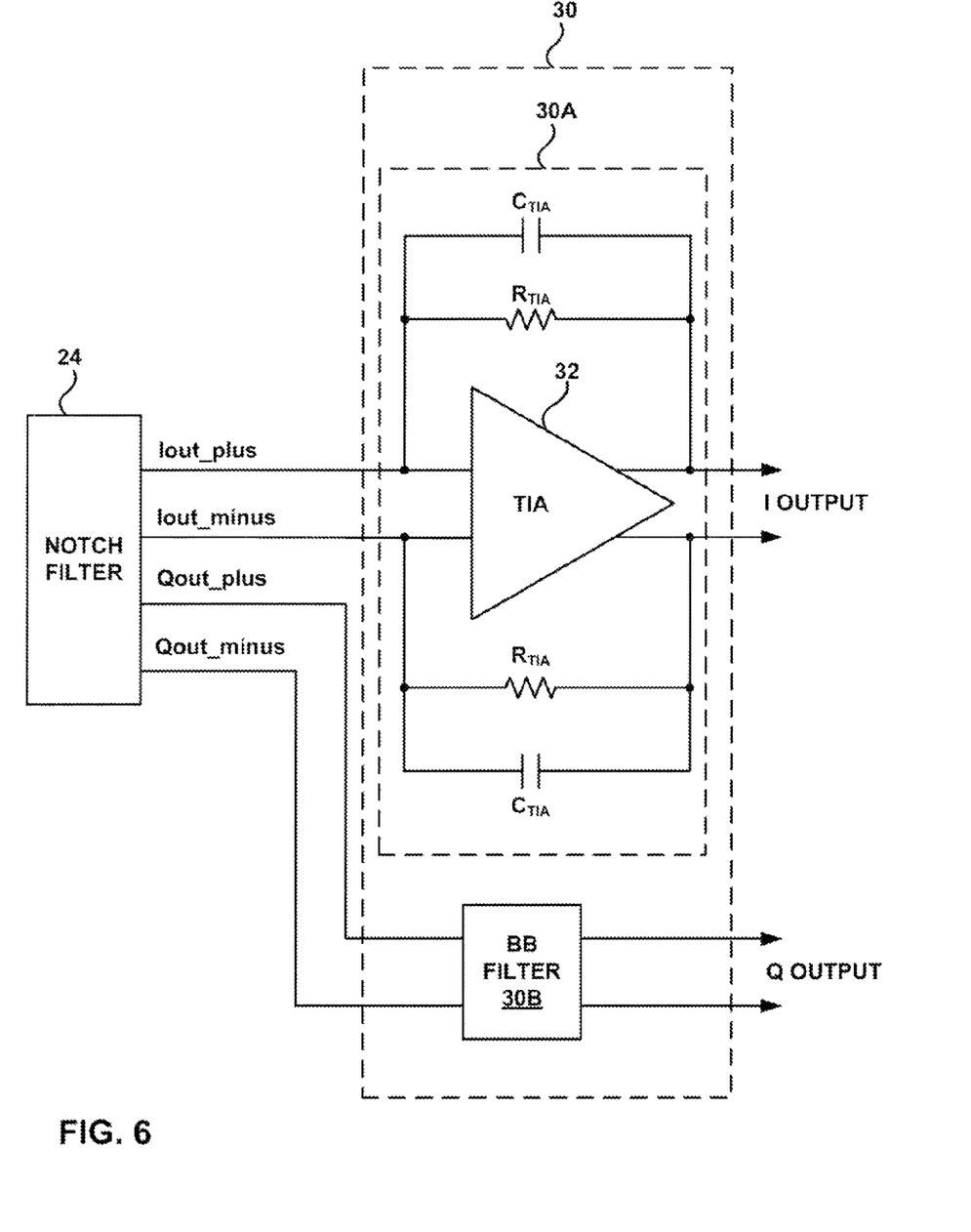
FIG. 6 is a block diagram illustrating an example baseband filter in greater detail.

FIG. 6 is a block diagram illustrating an example baseband filter 30 coupled to receive the output of a notch filter. In particular, FIG. 6 shows baseband filter module 30A in greater detail, including a transimpedance amplifier (TIA) 32 with feedback paths formed by resistors $R_{TIA}$ and capacitors $C_{TIA}$. For ease of illustration, additional details of the Q-component baseband filter module 30B are omitted from FIG. 6. For implementation, however, a Q component baseband filter module 30B may be provided in parallel to the I component baseband filter module 30A, as shown in FIG. 6, and may be constructed in a similar manner to baseband filter module 30A.

Each baseband filter module 30A, 30B may include a differential TIA 32 with feedback loops extending from positive and negative differential outputs to corresponding positive and negative differential inputs. Each feedback loop may include a resistance $R_{TIA}$ in parallel with a capacitance $C_{TIA}$ to set the gain and frequency response of the TIA and the baseband filter module 30A, 30B in which the TIA is provided, providing additional filtering of the received signal.

Baseband filter module 30A handles the I channel differential outputs of notch filter 24 to produce the I channel voltage outputs. In the example of FIG. 6, the differential TIA 32 in baseband filter module 30A has a first differential input that receives the Iout_plus signal from notch filter 24 and a second differential input that receives the Iout_minus signal from notch filter 24. Resistor $R_{TIA}$ and capacitor $C_{TIA}$ are coupled in parallel in a feedback path between the first input of TIA 32 and a first output of the TIA. Another resistor $R_{TIA}$ and capacitor $C_{TIA}$ are coupled in parallel in a feedback path between the second input of TIA 32 and a second output of the TIA. Baseband filter module 30B may be similarly constructed to apply baseband filtering to the Q channel differential outputs of notch filter 24 and produce Q channel voltage outputs.

Figure 7A:
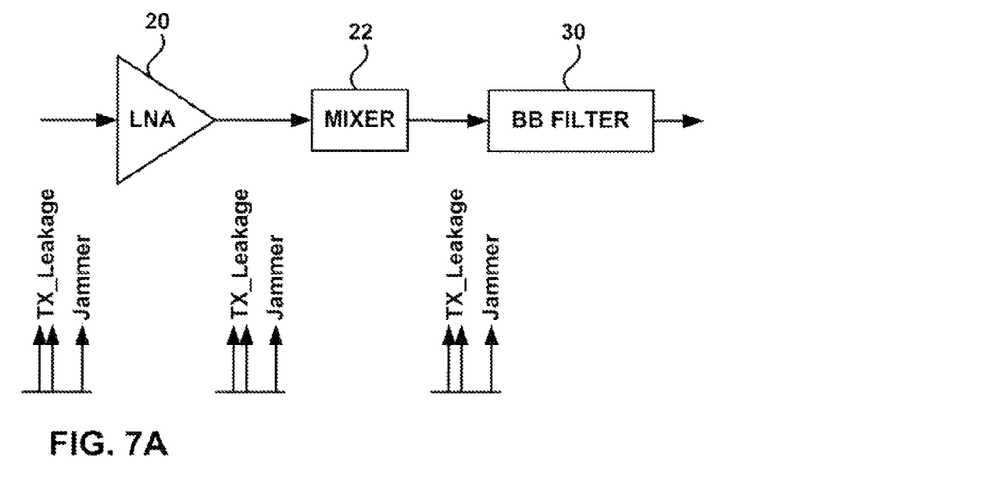
FIGS. 7A and 7B are diagrams illustrating TX signal leakage and jammer signal amplitudes with and without incorporation of a notch filter in the device of FIG. 1.
Figure 7B:
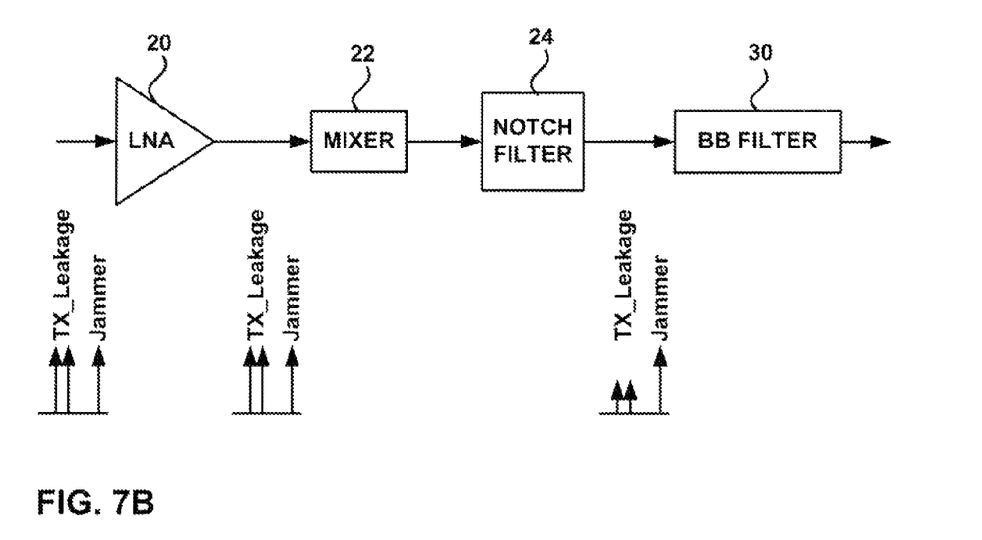

FIGS. 7A and 7B are diagrams illustrating TX signal leakage and jammer signal amplitudes with and without the incorporation of a notch filter 24 in device 10 of FIG. 1. In particular, FIGS. 7A and 7B show the signal path level through receiver 16 for cases in which notch filter 24 is used and not used. FIG. 7A shows an example in which notch filter 24 is not used. FIG. 7B shows an example in which notch filter 24 is used. The signal path flows from LNA 20 to mixer 22 and from mixer 22 to baseband filter 30, with incorporation of notch filter 24 between mixer 22 and baseband filter 30 in the example of FIG. 7B.

As shown in FIGS. 7A and 7B, the TX leakage signal (in current mode) is rejected by notch filter 24 significantly (at least 20 dB) compared with a receiver in which the notch filter is not used. In particular, the notch frequency is placed approximately at the TX to RX offset frequency at baseband, which may support a high linearity receiver. Rejection of the TX leakage signal results in a substantially lower voltage swing caused by the strong TX leakage at the output of mixer 22. This approach of Tx signal suppression via notch filter 24 may have several advantages. For example, notch filter 24 may reduce the second order distortion generated by the down-converter mixer 22 due to the strong TX leakage. In addition, notch filter 24 may reduce cross modulation distortion (XMD) generated by the down-converter mixer 22 due to the mixing of a close-in jammer with the strong TX leakage. Notch filter 24 also may reduce the TX leakage current into baseband filter 30, and TIA 32, which follows the down-converter mixer 22. Reducing TX leakage current into TIA 32 may result in low distortion and lower noise figure degradation in baseband filter 30.

In the example of FIGS. 7A and 7B, the LNA receives a TX signal and a jammer (JAM) signal situated at frequencies of 830 MHz and 875 MHz, respectively. Signal levels in FIG. 7B indicate signal levels with a notch filter 24 present in the receiver 16. Signal levels in the FIG. 7A indicate signal levels without a notch filter 24 present in the receiver 16. At the input of LNA 20, in this example, the TX leakage and JAM voltage signals have peak amplitudes of approximately 15.8 millivolts (mVp). At the output of the LNA, the TX and JAM signals are converted to current signals with peak amplitudes of approximately 500 microamps (µAp). At the output of the down-converter mixer 22, without notch filter 24, the TX and JAM signals have peak current amplitudes of approximately 427 µAp. With notch filter 24, however, the TX and JAM signals have current amplitudes of approximately 42.7 µAp and 427 µAp, respectively. Hence, the notch filter 24 may be capable of substantially reducing the TX leakage signal by approximately 20 dB in the example of FIG. 7B.

Figure 8:
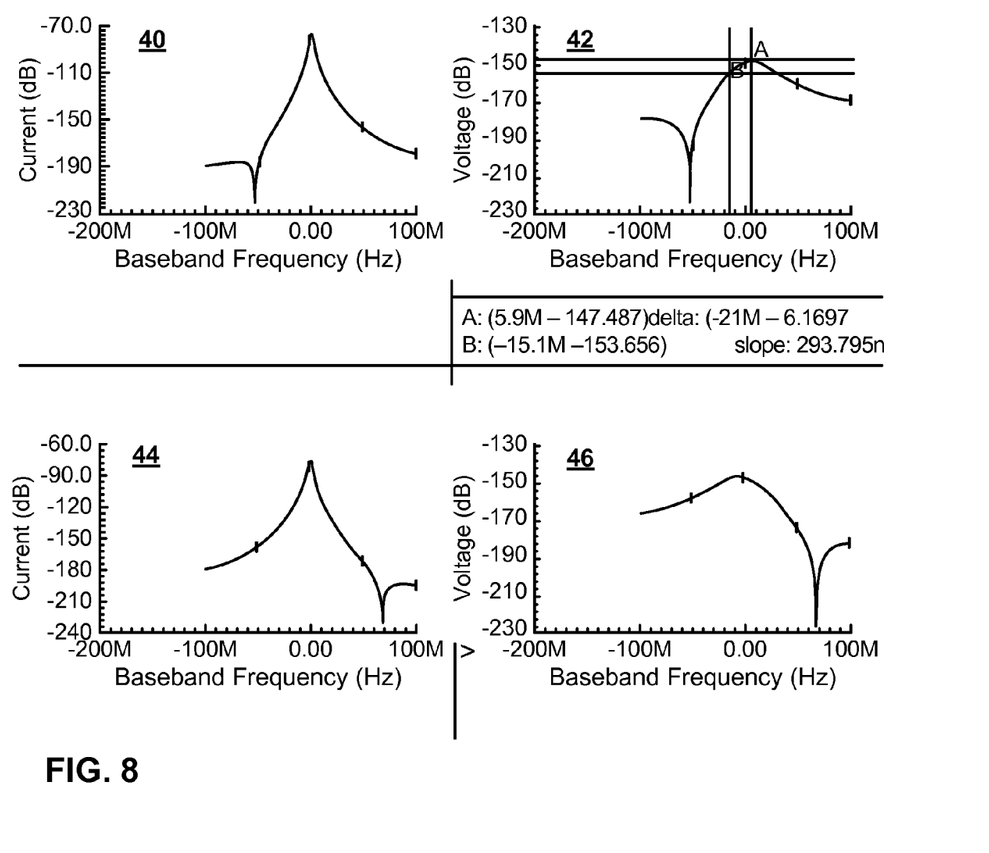
FIG. 8 contains graphs illustrating current and voltage output frequency response for a receiver including a notch filter.

FIG. 8 contains graphs 40, 42, 44, 46 illustrating an example of current and voltage output frequency response for a receiver including an notch filter. The x-axis of each graph 40, 42, 44, 46 shows the baseband frequency of the received signal. The y-axis shows the signal amplitude level in dBs. In particular, the graphs 40, 44 on the left show the received current signal frequency response after application of the notch filter 24 and before TIA 32 of baseband filter 30. The graphs 42, 46 on the right show the received voltage signal frequency response after application of the notch filter 24 and after application of TIA 32 of baseband filter 30.

The output of the notch filter 24 is a current signal. The TIA 32 converts the current from the notch filter 24 into a voltage signal at the TIA output after the TIA feedback resistors. Hence, the graphs 42, 46 on the right side represent the output current of notch filter 24 while the graphs 40, 44 on the left side represent the output voltage produced by TIA 32 of baseband filter 32. Notably, in each case, notch filter 24 provides a significant attenuation of the signal in the region of the TX-RX offset frequency, i.e., the frequency to which the TX leakage signal is down-converted relative to the RX signal, which is down-converted to approximately DC. For PCS communication, for example, the notch filter may be constructed to attenuate the signal in the area of approximately 80 MHz. Graphs 40 and 42 show a notch response at approximately −80 MHz for the PCS example. Graphs 44 and 46 show a notch response at approximately +80 MHz. In each case, the notch is selected to correspond approximately to the offset frequency of the down-converted TX leakage signal component relative to the baseband center frequency of 0 Hz (dc).

Because the notch filter is a complex notch filter, i.e., handling both I and Q components, only one side of the TX band will be rejected. In particular, the frequency response of a complex filter is not symmetrical, in contrast to a real filter. Therefore, notch filter 24 produces either the lower side frequency response shown in the upper left graph 40 and upper right graph 42 (i.e., notch at −80 MHz) or the upper side frequency response shown in the lower left graph and lower right graph (i.e., notch at +80 Mhz), but not both. As shown in FIG. 8, the local oscillator (LO) polarity applied to the passive mixer 22 can be changed to realize upper side or lower side rejection of the TX leakage signal. In other words, upper side or lower side TX leakage signal rejection may be selected by changing the LO polarity. In particular, the LO polarity can be changed to produce the frequency response similar to that shown in either the upper left and upper right graphs 40, 42 or the lower left and lower right graphs 44, 46.

The techniques described in this disclosure may be used in any of a variety of full-duplex, wireless communication systems. Some examples of full-duplex, wireless communication systems are cellular (CELL), Personal Communication System (PCS), Digital Cellular System (DCS), and International Mobile Telecommunications-2000 (IMT-2000) systems. As one particular example, the techniques may be applied in a wireless communication device equipped for code division multiple access (CDMA) communication.

The receiver components described in this disclosure may be incorporated within a wireless communication device, which may further include analog-to-digital converter circuitry, a digital signal processor (DSP), a modem, and other suitable components that may be useful for transmitting, receiving, encoding and decoding data, voice or other signals. The modem may be formed, at least in part, by a DSP. The wireless communication device may be a mobile radiotelephone, a satellite phone, a mobile gaming console, a personal digital assistant (PDA), smart phone, television console, digital video or audio device, a laptop or desktop computer, a set top box, or any other device equipped for wireless communication.

Various aspects of the disclosure have been described. These and other aspects are within the scope of the following claims.

The invention claimed is:

1. A radio frequency (RF) receiver comprising:
   an amplifier that amplifies a received RF input signal comprising a desired signal and a transmit leakage signal;
   a mixer that down-converts a frequency of the amplified signal; and
   a notch filter that filters the down-converted signal to substantially reduce the down-converted transmit leakage signal, the notch filter having a notch frequency substantially equal to an offset frequency of the down-converted transmit leakage signal relative to the down-converted desired signal.

2. The receiver of claim 1, wherein the mixer comprises a passive mixer, and the notch filter comprises a complex notch filter comprising an arrangement of resistors and capacitors.

3. The receiver of claim 2, wherein the amplifier and the mixer comprise differential outputs, the mixer generating positive and negative in-phase (I) components and positive and negative quadrature (Q) components.

4. The receiver of claim 3, wherein the complex notch filter includes positive and negative I inputs, positive and negative I outputs, positive and negative Q inputs, and positive and negative Q outputs.

5. The receiver of claim 4, wherein a first one of the resistors is coupled between the positive I input and the positive I output, a second one of the resistors is coupled between the negative I input and the negative I output, a third one of the resistors is coupled between the positive Q input and the positive Q output, and a fourth one of the resistors is coupled between the negative Q input and the negative Q output.

6. The receiver of claim 5, wherein a first one of the capacitors is coupled between the positive I input and the positive Q output, a second one of the capacitors is coupled between the negative I input and the negative Q output, a third one of the capacitors is coupled between the positive Q input and the negative I output, and a fourth one of the capacitors is coupled between the negative Q input and the positive I output.

7. The receiver of claim 6, wherein the resistors and capacitors have values selected such that the complex filter substantially attenuates the down-converted signal at approximately a frequency of the down-converted transmit leakage signal.

8. The receiver of claim 7, wherein the mixer down-converts a component of the amplified signal corresponding to the desired signal to approximately 0 Hz, and down-converts a component of the amplified signal corresponding to the transmit leakage signal to an offset frequency.

9. The receiver of claim 8, wherein the offset frequency is one of approximately 80 MHz or approximately 45 MHz.

10. The receiver of claim 1, further comprising an antenna that receives the desired signal, a duplexer that couples the amplifier to the antenna, a baseband filter that filters an output of the notch filter, and a modem that demodulates an output of the baseband filter.

11. The receiver of claim 1, wherein the notch filter comprises a complex notch filter comprising resistors and capacitors arranged such that the complex filter substantially attenuates the down-converted signal at approximately a frequency of the transmit leakage signal.

12. A notch filter for a radio frequency (RF) receiver, the notch filter comprising:
    a first resistor coupled between a positive in-phase (I) input and a positive I output;
    a second resistor coupled between a negative I input and a negative I output;
    a third resistor coupled between a positive quadrature (Q) input and a positive Q output;
    a fourth resistor coupled between a negative Q input and a negative Q output;
    a first capacitor coupled between the positive I input and the positive Q output;
    a second capacitor coupled between the negative I input and the negative Q output;
    a third capacitor coupled between the positive Q input and the negative I output; and a
    fourth capacitor coupled between the negative Q input and the positive I output,
    wherein the resistor and capacitor values are selected to substantially reduce a down-converted transmit leakage signal in an input signal applied at the inputs.

13. The notch filter of claim 12, wherein the notch filter is coupled to receive the down-converted signal from a passive mixer.

14. The notch filter of claim 13, wherein the mixer down-converts a component of the amplified signal corresponding to a desired signal to approximately 0 Hz, and down-converts a component of the amplified signal corresponding to the transmit leakage signal to an offset frequency, the resistor and capacitor values being selected to substantially attenuate the down-converted signal at approximately the offset frequency.

15. The notch filter of claim 14, wherein the offset frequency is one of approximately 80 MHz or approximately 45 MHz.

16. A wireless communication device comprising:
    an antenna;
    a radio frequency (RF) transmitter that generates a transmit (TX) signal;
    a duplexer that couples the TX signal to the antenna;
    an RF receiver that receives an RF input signal from the antenna via the duplexer, wherein the RF receiver comprises:
      an amplifier that amplifies the received RF input signal comprising a desired signal and a transmit leakage signal coupled from the duplexer;
      a mixer that down-converts the amplified signal; and
      a notch filter that filters the down-converted signal to substantially reduce the down-converted transmit leakage signal, the notch filter having a notch frequency substantially equal to an offset frequency of the down-converted transmit leakage signal relative to the down-converted desired signal.

17. The device of claim 16, wherein the mixer comprises a passive mixer, and the notch filter comprises a complex notch filter comprising an arrangement of resistors and capacitors.

18. The device of claim 17, wherein the amplifier and the mixer comprise differential outputs, the mixer generating positive and negative in-phase (I) components and positive and negative quadrature (Q) components.

19. The device of claim 18, wherein the complex notch filter includes positive and negative I inputs, positive and negative I outputs, positive and negative Q inputs, and positive and negative Q outputs.

20. The device of claim 19, wherein a first one of the resistors is coupled between the positive I input and the positive I output, a second one of the resistors is coupled between the negative I input and the negative I output, a third one of the resistors is coupled between the positive Q input and the positive Q output, and a fourth one of the resistors is coupled between the negative Q input and the negative Q output.

21. The device of claim 20, wherein a first one of the capacitors is coupled between the positive I input and the positive Q output, a second one of the capacitors is coupled between the negative I input and the negative Q output, a third one of the capacitors is coupled between the positive Q input and the negative I output, and a fourth one of the capacitors is coupled between the negative Q input and the positive I output.

22. The device of claim 21, wherein the resistors and capacitors have values selected such that the complex filter substantially attenuates the down-converted signal at approximately a frequency of the transmit leakage signal.

23. The device of claim 22, wherein the mixer down-converts a component of the amplified signal corresponding to the desired signal to approximately 0 Hz, and down-converts a component of the amplified signal corresponding to the transmit leakage signal to an offset frequency.

24. The device of claim 23, wherein the offset frequency is one of approximately 80 MHz or approximately 45 MHz.

25. The device of claim 16, wherein the notch filter comprises a complex notch filter comprising resistors and capacitors arranged such that the complex filter substantially attenuates the down-converted signal at approximately a frequency of the transmit leakage signal.

26. A method comprising:
amplifying a received RF input signal comprising a desired signal and a transmit leakage signal;
down-converting a frequency of the amplified signal; and
filtering the down-converted signal with a notch filter having a notch frequency substantially equal to an offset frequency of the down-converted transmit leakage signal relative to the down-converted desired signal to substantially reduce the down-converted transmit leakage signal.

27. The method of claim 26, further comprising down-converting the frequency of the amplified signal with a passive mixer, wherein the notch filter comprises a complex notch filter comprising an arrangement of resistors and capacitors.

28. The method of claim 27, wherein the passive mixer generates positive and negative in-phase (I) components and positive and negative quadrature (Q) components.

29. The method of claim 28, wherein the complex notch filter includes positive and negative I inputs, positive and negative I outputs, positive and negative Q inputs, and positive and negative Q outputs.

30. The method of claim 29, wherein a first one of the resistors is coupled between the positive I input and the positive I output, a second one of the resistors is coupled between the negative I input and the negative I output, a third one of the resistors is coupled between the positive Q input and the positive Q output, and a fourth one of the resistors is coupled between the negative Q input and the negative Q output.

31. The method of claim 30, wherein a first one of the capacitors is coupled between the positive I input and the positive Q output, a second one of the capacitors is coupled between the negative I input and the negative Q output, a third one of the capacitors is coupled between the positive Q input and the negative I output, and a fourth one of the capacitors is coupled between the negative Q input and the positive I output.

32. The method of claim 31, wherein the resistors and capacitors have values selected such that the complex filter substantially attenuates the down-converted signal at approximately a frequency of the transmit leakage signal.

33. The method of claim 32, wherein down-converting comprises down-converting a component of the amplified signal corresponding to the desired signal to approximately 0 Hz, and down-converting a component of the amplified signal corresponding to the transmit leakage signal to an offset frequency.

34. The method of claim 33, wherein the offset frequency is one of approximately 80 MHz or approximately 45 MHz.

35. The method of claim 26, further comprising receiving the desired signal via an antenna, and receiving the transmit leakage signal via a duplexer coupled to the antenna and to a transmitter.

36. The method of claim 26, wherein the notch filter comprises a complex notch filter comprising resistors and capacitors arranged such that the complex filter substantially attenuates the down-converted signal at approximately a frequency of the distortion caused by the transmit leakage signal.

* * * * *